United States Patent [19]

Gill et al.

[11] Patent Number: 5,222,230

[45] Date of Patent: Jun. 22, 1993

[54] CIRCUITRY FOR TRANSFERRING DATA FROM A DATA BUS AND TEMPORARY REGISTER INTO A PLURALITY OF INPUT REGISTERS ON CLOCK EDGES

[75] Inventors: Michael C. Gill, Dallas; Henry M. Darley, Plano; Edison H. Chiu, Richardson; Jeffrey A. Niehaus, Dallas, all of Tex.

[73] Assignee: Texas Instruments Incorporated, Dallas, Tex.

[21] Appl. No.: 439,966

[22] Filed: Nov. 20, 1989

Related U.S. Application Data

[62] Division of Ser. No. 149,780, Jan. 29, 1988, Pat. No. 4,916,651.

[51] Int. Cl.⁵ .................................................. G06F 13/14
[52] U.S. Cl. ........................................ 395/550; 395/775; 364/DIG. 1; 364/260.2; 364/271.9
[58] Field of Search ... 364/200 MS File, 900 MS File; 395/550, 775

[56] References Cited

U.S. PATENT DOCUMENTS

| | | | |
|---|---|---|---|
| 3,820,079 | 6/1974 | Bergh et al. | 364/200 |
| 4,016,545 | 4/1977 | Lipovski | 364/900 |
| 4,370,709 | 1/1983 | Fosdick | 364/200 |
| 4,398,085 | 8/1983 | Benedict | 364/900 |

OTHER PUBLICATIONS

"Microprocessors And Microcomputer Development Systems" by Rafiuzzaman, 1984, pp. 65-75, 150-153.

Primary Examiner—Lawrence E. Anderson
Attorney, Agent, or Firm—W. James Brady; B. Peter Barndt; Richard L. Donaldson

[57] ABSTRACT

A floating point processor (10) is provided having a multiplier (48) and an ALU (54) for performing arithmetic calculations simultaneously. The output of the multiplier (48) and ALU (54) are stored in a product register (64) and a sum register (66), respectively. Multiplexers (40,42,44,46) are provided at the inputs to the multiplier (48) and the ALU (54). The multiplexers choose between data in input registers (32,34), product and sum registers (64,66), and an output register (76). Since the multiplier (48) and ALU (54) operate simultaneously, and since the outputs of the multiplier (48) and ALU (54) are available to the multiplexers (40-46), product of sums calculations and sum of products calculations may be performed rapidly. An input stage (12) uses a temporary register (18) to store data from a data bus on the first clock edge, and configuration logic (28) for directing data from the data bus and the temporary register (18) to the input registers (32,34) on a second clock edge.

7 Claims, 1 Drawing Sheet

CIRCUITRY FOR TRANSFERRING DATA FROM A DATA BUS AND TEMPORARY REGISTER INTO A PLURALITY OF INPUT REGISTERS ON CLOCK EDGES

This is a division of application Ser. No. 07/149,780, filed Jan. 29, 1988, now U.S. Pat. No. 4,916,651.

RELATING APPLICATIONS

"HIGH SPEED MULTIPLIER", by Henry Merrick Darley, et al., filed, concurrently herewith, Ser. No. 149,779, now abandoned, which was continued as Ser. No. 418,079, filed Oct. 3, 1989, now abandoned, which was continued as Ser. No. 652,241, filed Feb. 5, 1991, now U.S. Pat. No. 5,115,408.

"FLOATING POINT/INTEGER PROCESSOR WITH DIVIDE AND SQUARE ROOT FUNCTIONS", by Henry Merrick Darley et al., filed concurrently herewith, Ser. No. 150,363, now U.S. Pat. No. 4,878,190.

1. Technical Field of the Invention

This invention relates in general to integrated circuits, and more particularly to a floating point processor having simultaneous multiplication and addition features.

2. Background of the Invention

High-speed computation is a critical design factor in many systems such as computers, signal processors, and process controllers. The systems increasingly rely on a limited number of LSI integrated circuits to perform floating point calculations.

A number of multi-chip implementations of floating point processes have become available on the market. These implementations can be roughly divided into two classes: those based on a microprocessor and those based on a bit slice family. The microprocessor based co-processors are often single chip solutions, but are slower than the bit slice family because of the higher degree of parallelism in the math execution in the bit slice approaches. Most bit slice approaches use separate chips for multiplication operations and addition operations.

Recently, a processor having combined multiplication and addition operations on one integrated circuit has become available. However, the multiplication and addition functions cannot be performed in parallel. As a result, common operations such as sum of products and product of sums require additional clock cycles.

Thus, a need has arisen in the industry for a floating point architecture, which allows simultaneous operation of multiplying and adding functions and enabling fast computation of sums of products and product of sums.

SUMMARY OF THE INVENTION

In accordance with the present invention, a floating point processor is provided which substantially eliminates or prevents the disadvantages and problems associated with prior floating point processors.

In a first aspect of the present invention, an integrated circuit for processing data is providing having a multiplier and an adder operable to perform calculations simultaneously. Data path circuitry for connecting the output of the multiplier with an input to the adder and for connecting the output of the adder to an input of the multiplier.

This aspect of the present invention provides the technical advantage that sum of products calculations and product of sums calculations may be performed rapidly.

In a second aspect of the present invention, a bus interface is provided for receiving two double precision words in a variety of formats, with the capability to load two double precision numbers in a single clock cycle. Data from the data bus is stored in a temporary register upon a first clock edge; upon a second clock edge, portions of the data in the data register and portions of the data on the data bus are transferred to selected portions of the first and second registers, responsive to a configuration control signal.

This aspect of the present invention provides the technical advantage of allowing the floating point processor to receive data at a high speed from a variety of bus structures by adjusting a configuration control code.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
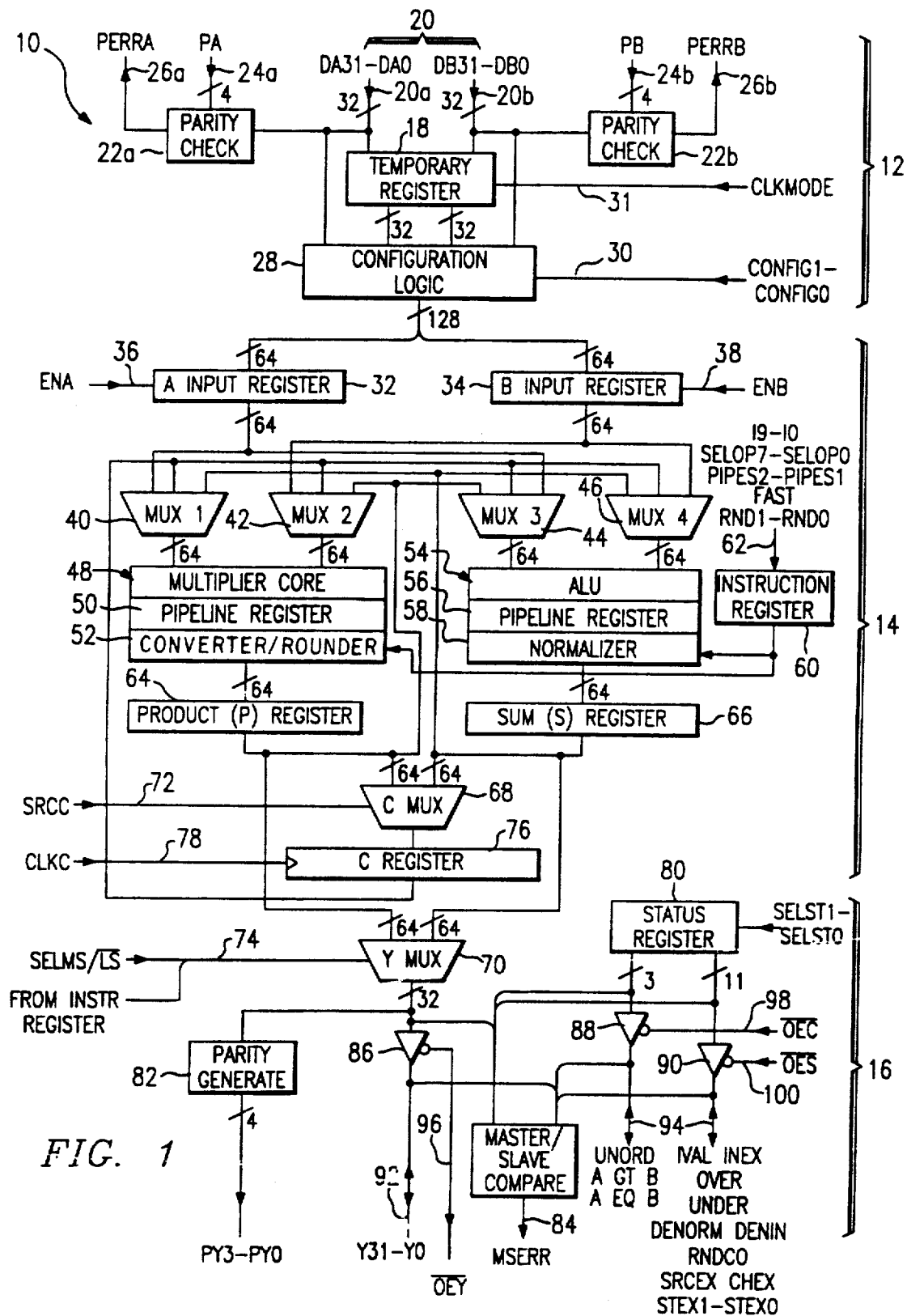
FIG. 1 illustrates the architecture of the floating point processor of the present invention.

The preferred embodiment of the present invention is best understood by referring to FIG. 1 of the drawings.

FIG. 1 illustrates a circuit diagram of the floating point processor of the present invention. The floating point processor 10 of the present invention is shown in three stages: an input stage 12, a computation stage 14 and an output stage 16. The input stage comprises a temporary register 18 connected to the input data bus 20 comprised of the A input data bus 20a and the B input data bus 20b. The parity checkers 22a-b are connected to the input data buses 20a-b, respectively, and to parity lines 24a-b. Parity error lines 26a-b are output from the parity checkers 22a-b. The input data buses 20a-b are also connected to configuration logic 28 along with the outputs of the temporary register 18. A configuration control signal 30 and a "clock mode" signal 31 are input to the configuration logic 28.

The output of the configuration logic 28 is connected to A and B input registers 32 and 34. Enable signal lines 36 and 38 are connected to the A input register 32 and B input register 34, respectively. The A and B input registers 32 and 34 are connected to a series of multiplexers 40, 42, 44, and 46. The A input register 32 is connected to multiplexer 40 and multiplexer 44, and the B input register 34 is connected to multiplexer 42 and multiplexer 46. The output of the multiplexers 40 and 42 are input to a multiplier 48 having a pipeline register 50 and a converter/rounder 52. Multiplexers 44 and 46 are connected to an ALU 54 having a pipeline register 56 and a normalizer 58. The multiplier 48 and the ALU 54 are connected to an instruction register 60, which is connected to the instruction bus 62. The output of the multiplier 48 is connected to a product register 64 and the output of the ALU 54 is connected to a sum register 66. The outputs of the product register 64 and the sum register 66 are connected to multiplexers 68 and 70. The output of the product register 64 is also connected to multiplexers 42 and 44, while the output of the sum register 66 is connected to multiplexers 40 and 46. The multiplexers 68 and 70 are connected to control signal lines 72 and 74, respectively.

The output of the multiplexer 68 is connected to the C register 76. The output of the C register 76 is connected to the multiplexers 40-46. The C register 76 is connected to clock signal line 78, which is clocked separately from the other registers.

The output stage 16 comprises the Y multiplexer 70, a status register 80, a parity generator 82, and a master/slave compare 84. The output of the multiplexer 70 is connected to the parity generator 82, the master/slave compare 84, and a buffer 86. The status register 80 is connected to the master/slave compare 84 and to buffers 88 and 90. The output of buffer 86 is connected to the output data bus 92 and to the master/slave compare 84. The output of the buffers 88 and 90 are connected to a status bus 94. The buffers 86-90 are controlled by control lines 96, 98 and 100, respectively.

The input stage 12 is designed to provide flexible input modes to accommodate a variety of bus designs. The configuration control signal comprises a two-bit signal, indicating one of four configurations for double precision input. The possible configurations are shown in Table 1.

TABLE 1

DOUBLE PRECISION INPUT DATA CONFIGURATION MODES

| | | LOADING SEQUENCE | | | |
|---|---|---|---|---|---|
| | | Data loaded into temp register on first clock and A/B registers on second clock | | Data loaded into A/B registers on second clocks | |
| Con- fig 1 | Con- fig 0 | A bus | B bus | A bus | B bus |
| 0 | 0 | B operand (MSH) | B operand (LSH) | A operand (MSH) | A operand (LSH) |
| 0 | 1 | A operand (LSH) | B operand (LSH) | A operand (MSH) | B operand (MSH) |
| 1 | 0 | A operand (MSH) | B operand (MSH) | A operand (LSH) | B operand (LSH) |
| 1 | 1 | A operand (MSH) | A operand (LSH) | B operand (MSH) | B operand (LSH) |

MSH = Most Significant Half
LSH = Least Significant Half

In each case, data is loaded from the A and B input data buses 20a-b into the temporary register 18 on a first clock cycle. On the rising edge of the second clock cycle, the new data on the A and B input data buses 20a-b and the data in the temporary register 18 is transferred to the appropriate registers. The configuration control signal 30 allows the user to configure his data in various ways. In Table 1, the B operand refers to the operand that will be loaded into the B register 34, and the A operand refers to the operand that will be loaded into A register 32.

The temporary register 18 is provided to enable double precision numbers on a single precision bus to be loaded in one clock cycle. The contents of the A bus 20a are loaded into the upper thirty-two bits of the temporary register; the contents of the B bus 20b are loaded into the lower thirty-two bits. The clock mode signal 31 determines the clock edge on which the data will be stored in the temporary register. When the clock mode signal 31 is low, data is loaded on the rising edge of the clock; when the clock mode signal 31 is high, data is loaded on the falling edge of the clock. By loading the A and B register 32 and 34 on the falling edge of the clock, two double precision numbers may be loaded in a single clock cycle, since the contents of the A and B buses 20a-b, and the temporary register 18 are loaded into the A and B registers 32 and 34 on the next rising edge.

Thus, the present invention provides the technical advantage of flexible input operations, accommodating double precision data at high speeds.

The four multiplexers 40-46 select the operands which will be connected to the multiplier 48 and the ALU 54. The multiplexers 40-46 select the operands from the A input register 32, B input register 34, product register 64, sum register 66, or C register 76. The multiplexer configuration significantly reduces impediments in the data flow.

The ALU 54 provides addition and subtraction functions and conversions between integer and floating point numbers, and between single precision and double precision numbers. In an important aspect of the invention, the ALU may be operated independently or in parallel with the multiplier 48. The ALU 54 includes a pipeline register 56 and a rounder/normalizer 58.

The multiplier 48 performs a basic multiply function, a*b. The operands can be single precision or double precision numbers and can be converted to absolute values before multiplication takes place.

The pipeline registers 50 and 56 may be disabled to allow a flow through mode.

In "chained" instructions, wherein both the ALU 54 and multiplier 48 are operated simultaneously, several functions may be performed. The ALU operation may be chosen to implement a+b, a−b, 2−a, b−a. The ALU and multiplier results may be negated, and identity functions may be chosen for the ALU 54 and multiplier 48, i.e., a+0 and b*1.

The results of ALU and multiplier operations are latched into two output registers, the sum register 66 and the product register 64, on the rising edge of the system clock. The product register 64 holds the result of the multiplier operation and the sum register 66 holds the result of the ALU operation.

The C register is available for temporary storage of the results of an ALU or multiplier operation before feedback to the multiplier 48 or ALU 54 or it can hold a constant. The data source for the C register 76 is selected by the multiplexer 68 via the control signal line 72.

The C register does not load directly from an external data bus; however, it may be loaded without wasting a cycle by inputting the value as an A operand during an operation which uses only the ALU or multiplier and requires no external data input. Since B operand can be forced to zero in the ALU or to one in the multiplier, the A operand can be passed to the C register either by adding zero or multiplying by one, then selecting the input source to the C register 76.

The parity generator 82 generates parity bits for the Y multiplexer output 70, either for each byte or for each word of output.

The master/slave comparitor 84 is provided to compare data bytes from the Y output multiplexer 70 and the outputs of the data register 80 with data on the external output bus 92 and status bus 94. If the data bytes are not equal, a high signal is generated on the master/slave error output pin of the master/slave comparitor 84. During a compare operation in the ALU, the AEQB output of the status register 80 goes high when the A and B operands are equal. If the A operand is greater than the B operand during a compare, the AGTB output goes high in the status register 80. When any operation other than a compare is performed, either by the ALU or the multiplier, the AEQB signal is used as a zero detect.

The floating point processor 10 may be programmed to operate in a FAST mode. In the FAST mode, all denormalized inputs and outputs are forced to zero. A denormalized input has a form of a floating-point number with a zero exponent, a nonzero mantissa, and a zero in the leftmost bit of the mantissa (hidden or implicit bit). A denormalized number results from decrementing the biased exponent field to zero before normalization is complete. Since a denormalized number cannot be input to the multiplier, it must first be converted to a wrapped number by the ALU. When the mantissa of the denormalized number is normalized by shifting it to the left, the exponent field decrements from all zeros to a negative two's complement number.

The floating point processor 10 supports four IEEE standard rounding modes. The rounding modes supported are round to nearest, round toward zero (truncate), round toward infinity (round up), and round toward minus infinity (round down). The ability of the floating point processor to simultaneously perform multiplication and addition functions allows fast calculations of a sum of products or a product of sums. To calculate a sum of products, the floating point processor 10 can operate on external data inputs in the multiplier while the ALU operates on feedback from the previous calculation. Conversely, the calculate product of sums, the ALU operates on external data inputs while the multiplier operates on feedback from the previous calculation.

This mode of operation is used repeatedly in division and square root calculations, and in matrix operations.

Table 2 illustrates the operations used in multiplying sets of data operands and accumulating the results, the basic operations involved in computing a sum of products. In Table 2, the sum of four products is calculated. In Table 2, the P() and S() refer to the quantity stored in the product register 64 and sum register 66, respectively.

TABLE 2

| Clock Cycle | Single Precision Sum of Products Multiplier/ALU Operations |
|---|---|
| 1 | Load $A_1$, $B_1$ |
|   | $A_1 * B_1$ |
| 2 | Pass $P(A_1B_1)$ to S |
|   | Load $A_2$, $B_2$ |
|   | $A_2 * B_2$ |
| 3 | $S(A_1B_1) + P(A_2B_2)$ |
|   | Load $A_3$, $B_3$ |
|   | $A_3 * B_3$ |
| 4 | $S(A_1B_1 + A_2B_2) + P(A_3B_3)$ |
|   | Load $A_4$, $B_4$ |
|   | $A_4 * B_4$ |
| 5 | $S(A_1B_1 + A_2B_2 + A_3B_3) + P(A_4B_4)$ |
| 6 | New Instruction |

Where long streams of sums of products or product of sums are to be calculated, the floating point processor 10 of the present invention essentially halves the time necessary to complete the computation. Therefore, the present invention provides the technical advantage of greatly enhanced speed over prior art floating point processors.

Although the present invention has been described in detail, it should be understood that various changes, substitutions and alterations can be made herein without departing from the spirit and scope of the invention as defined by the appended claims.

What is claimed is:

1. A method of receiving data from a data bus comprising the steps of:
   receiving data from the data bus into a temporary register on a first clock edge responsive to a configuration signal; and
   selectively transferring data from said temporary register and the data bus into a plurality of input registers on a second clock edge.

2. The method of claim 1, wherein said step of storing data in said temporary register comprises the step of storing data in said temporary register from the data bus upon a falling edge of a clock pulse and said step of transferring data comprises transferring data from said temporary register and the data bus to said input registers upon the next rising edge of said clock pulse.

3. The method of claim 1 wherein said step of storing data in said temporary register comprises the step of storing data in said temporary register from the data bus upon a rising edge of a clock pulse and said step of transferring data comprises transferring data from said temporary register and the data bus to said input registers upon the next falling edge of said clock pulse.

4. Circuitry for receiving data from a bus comprising:
   a temporary register for storing data present on said data bus at a first clock edge;
   a first input register for storing a data word comprising bits from said data bus;
   a second input register for storing a data word comprising bits from said data bus; and
   configuration logic connected between said temporary register and said first and second input registers and between the data bus and said first and second input data registers for selectively connecting portions of the data bus and said temporary register to said first and second input registers at a second clock edge.

5. The integrated circuit of claim 4 wherein:
   said temporary register is operable to latch data on a following edge of a clock pulse; and
   said configuration logic circuitry is operable to connect said temporary register and the data bus to said first and second input registers upon the next rising edge of said clock pulse.

6. The integrated circuit of claim 4 wherein:
   said temporary register is operable to latch data on a rising edge of a clock pulse; and
   said configuration logic circuitry is operable to connect said temporary register and the data bus to said first and second input registers upon the next falling edge of said clock pulse.

7. The circuitry of claim 4 wherein said configuration logic comprises:
   circuitry to selectively connect the high order bits of said temporary register to either the high order bits of said first input register, the high order bits of said second input register, or the low order bits of said second input register responsive to a control signal;
   circuitry to selectively connect the low order bits of the data in said temporary register to either the high order bits of said first input register, the low order bits of said first input register, the high order bits of said second input register, or the low order bits of said second input register responsive to said control signal;

circuitry to selectively connect the high order bits from the data bus to either the high order bits of said first input register, the low order bits of said first input register, the high order bits of said second input register, or the low order bits of said second input register responsive to said control signal; and circuitry to selectively connect the low order bits from the data bus to either the high order bits of said first input register, the low order bits of said first input register, the high order bits of said second input register, or the low order bits of said second input register responsive to said control signal.

* * * * *